United States Patent Office 3,194,357
Patented July 13, 1965

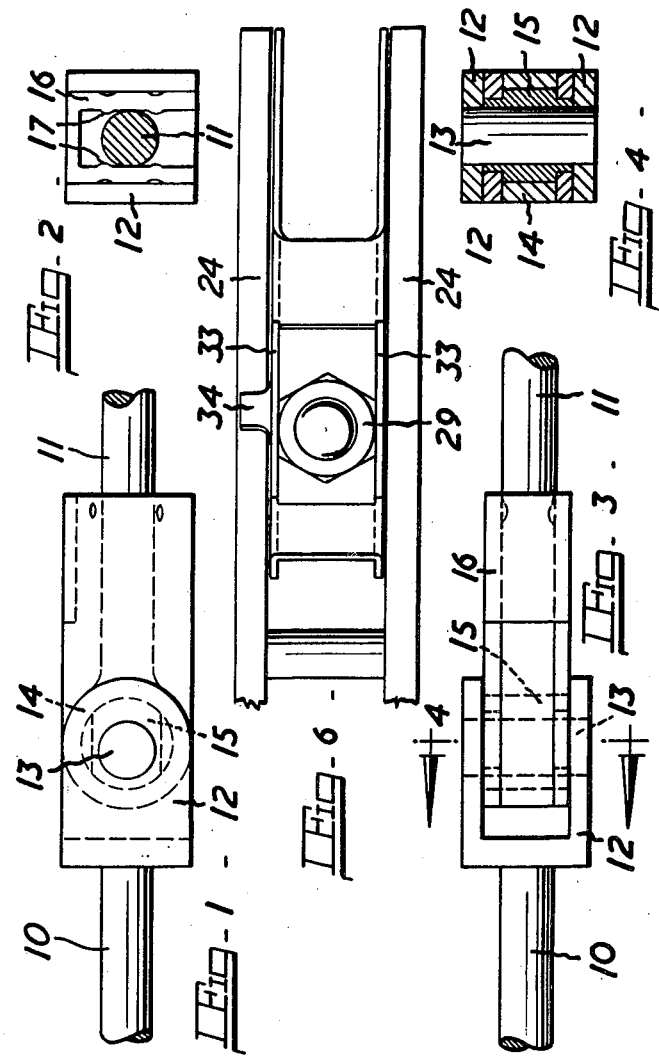

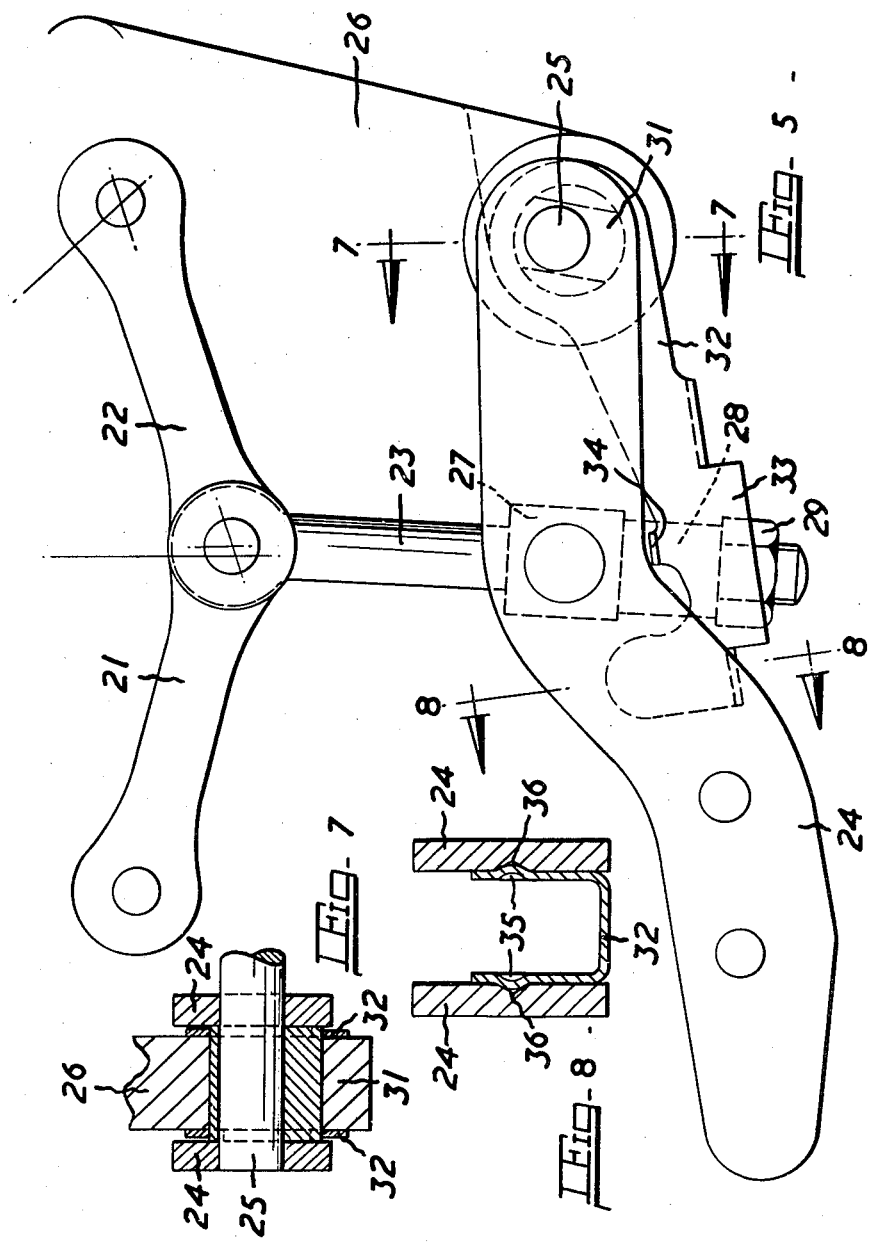

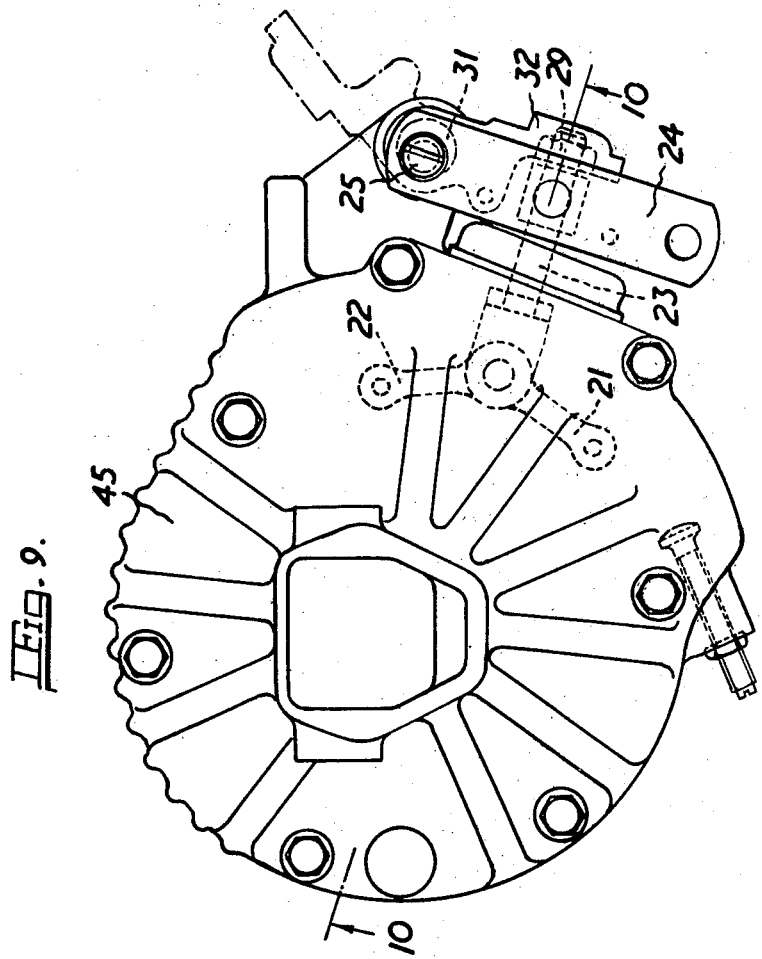

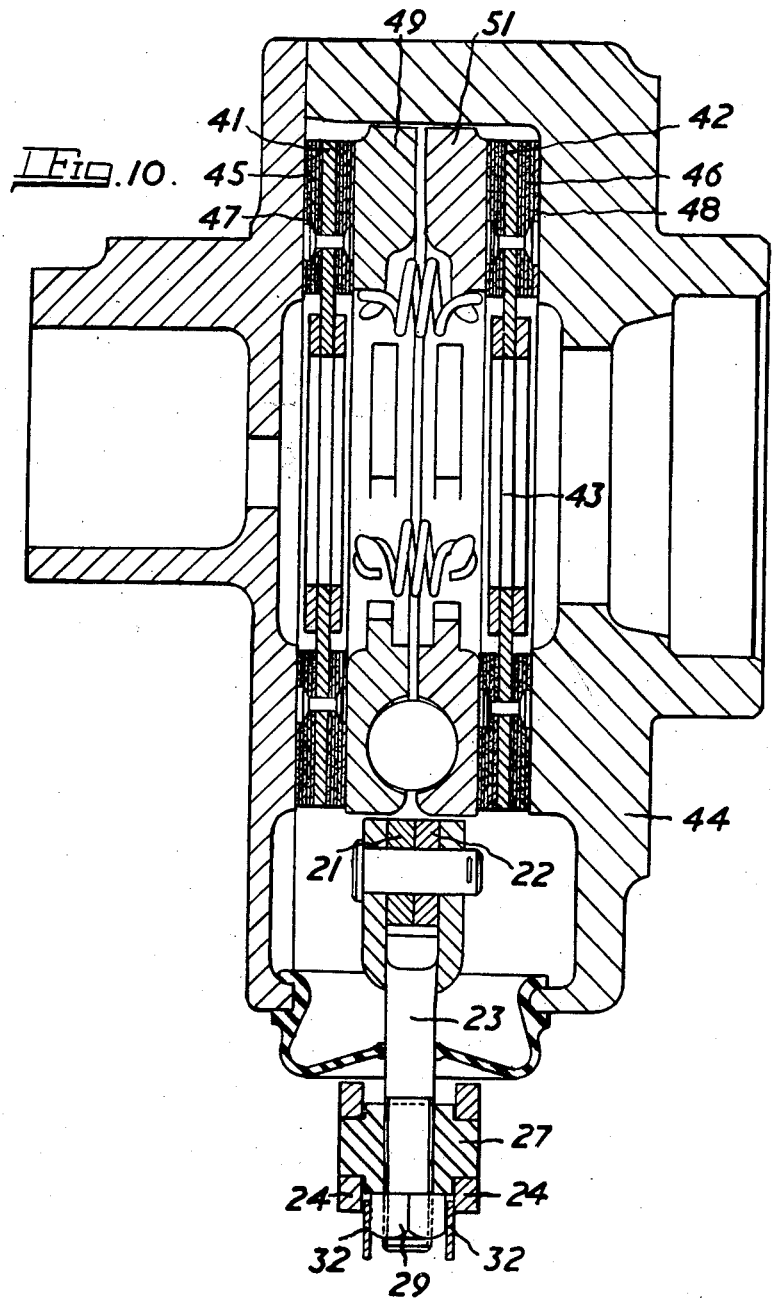

3,194,357
MEANS FOR ADJUSTING VEHICLE BRAKES
Alfred Yardley, Blackheath, England, assignor to Girling Limited, Tyseley, England, a British company
Filed Feb. 25, 1963, Ser. No. 260,558
11 Claims. (Cl. 188—196)

This invention relates to improvements in means for adjusting vehicle brakes to compensate for wear of the friction linings, and is particularly concerned with the adjustment of brake actuating mechanism of the kind in which the engagement of the friction surfaces is effected or initiated by mechanism incuding a pull-rod or equivalent member of which the effective length is adjustable to take up wear of the friction linings.

One of the objects of our invention is to provide means for controlling the adjustment of the mechanism to ensure that a predetermined minimum clearance is maintained between the friction surfaces in the off position of the brake.

According to our invention, brake actuating mechanism incorporates between an actuating means and the brake a mechanical transmission of which the effective length is adjustable and including two co-operating members of which the relative position is variable by an amount substantially equal to a desired clearance to be maintained between the friction surfaces of the brake, the members being movable relatively in one direction while the effective length of the transmission is adjusted to bring the friction surfaces into contact and being subsequently returned to their original relative positions to establish the desired clearance.

For example, the transmission between the actuating means and the brake may incorporate a pivot pin mounted in an eccentric bush which is adapted to be moved angularly to displace the axis of the pin through a predetermined distance while the effective length of a pullrod or equivalent member is adjusted to bring the friction members of the brake into contact, the bush then being returned to its normal position to establish the desired clearance between the friction surfaces.

This provides a very simple method of ensuring a desired clearance and prevents overtightening of the adjustment as the mechanism can be so arranged that the bush cannot be returned to its normal position or offers abnormal resistance to its return movement if the adjustment has been over-tightened.

The bush is conveniently associated with a control lever which may also be arranged to lock the means for adjusting the effective length of the rod when the lever is returned to its normal position.

Two embodiments of our invention are illustrated by way of example in the accompanying drawings in which:

FIGURE 1 is a side elevation of one simple form of mechanism for preventing over adjustment of the effective length of a pull rod through which a brake is applied, and providing a predetermined clearance between the braking surfaces;

FIGURE 2 is an end view of FIGURE 1;

FIGURE 3 is a plan of FIGURE 1;

FIGURE 4 is a transverse section on the line 4—4 of FIGURE 3;

FIGURE 5 is a front elevation of another form of mechanism for preventing over-adjustment of brake applying means and providing predetermined clearance between the braking surfaces;

FIGURE 6 is an inverted plan of the central part of the mechanism shown in FIGURE 5;

FIGURE 7 is a transverse section on the line 7—7 of FIGURE 5;

FIGURE 8 is a transverse section on the line 8—8 of FIGURE 5;

FIGURE 9 is an end elevation of a brake incorporating an adjuster similar to that shown in FIGURES 5 to 8; and FIGURE 10 is a section on the line 10—10 of FIGURE 9.

In the mechanism shown in FIGURES 1 to 4, 10, 11 are aligned parts of a pull rod forming part of a mechanical transmission through which a brake is applied The effective length of the pull rod is adjustable by any convenient means to compensate for wear of the friction members of the brake.

The rod 10 terminates in a fork end 12 in which are mounted the ends of a transverse pin 13. The rod 11 terminates in an eye 14 which receives an eccentric bush 15 rotatably mounted on the pin 13. The overall length of the bush is slightly less than the internal width of the fork, and the ends of the bush are keyed in the flanges of a lever 16 of channel section which lies within the fork 12 and normally fits over the rod 11 as shown in the drawings.

The angular position of the eccentric bush is such that when the lever 16 is in its normal position, the part of the bush of maximum radial thickness is in alignment with the common axis of the two parts 10, 11 of the rod as shown in FIGURE 1.

Before the length of the pull rod is adjusted to compensate for wear of the friction members of the brake, the lever 16 is swung out of alignment with the rod to move the eccentric bush 15 angularly and reduce slightly the effective length of the rod. The rod is then shortened by the normal adjusting means until the friction surfaces of the brake are in contact, and the lever is then returned to its normal position so that the eccentric bush returns the two parts 10, 11 of the rod to their original relative positions and a small clearance determined by the eccentricity of the bush is established between the friction surfaces of the brake.

If the rod is over-adjusted by the normal adjusting means, the rod is put under tension and the fact that it has been over-adjusted will be indicated by excessive frictional resistance to the return movement of the lever 16.

Opposed dimples 17 may be provided on the side flanges of the lever as shown in FIGURE 2 to co-operate with the rod 11 for retaining the lever in its normal position.

FIGURES 5 to 8 of the drawings show another form of our invention suitable for use with a disc brake of known type such as that shown in FIGURES 9 and 10.

In this brake, two spaced discs 41, 42 are slidably keyed by means of internal splines 43 on a rotatable shaft (not shown) and are enclosed within a stationary housing 44. The discs carry on opposite faces rings or pads of friction material 45, 46, and the end walls of the housing present radial braking surfaces 47, 48 for engagement by the rings or pads of friction material on the outer faces of the discs.

Co-operating annular pressure plates 49, 51 are located between the discs, and balls or rollers located between the plates co-operate with inclined ramps or pits in the adjacent faces of the plates so that on relative angular movement between the plates they are urged apart to bring them into frictional engagement with the discs and to urge the discs into frictional engagement with the surfaces 47, 48 on the housing.

The application of the brake is initiated by moving the plates 49, 51 angularly in opposite directions. When they engage the discs, they tend to be carried round with the discs, and when one plate is arrested by a stop the continued movement of the other with the discs completes the application of the brake.

In the arrangement illustrated, the relative angular movement between the angularly movable members of the brake to initiate the application of the brake is effected by toggle links 21, 22 of which the outer ends are pivotally connected to the angularly movable plates 49 and 51 and the junction is coupled through a pull rod 23 of adjustable length to an actuating lever 24. The lever is a bifurcated member pivoted at one end on a pin 25 in a stationary housing 26, the other end of the lever being coupled to or engaged by any convenient form of hydraulic or mechanical operating means for moving the rod angularly in an anti-clockwise direction about its pivot. The pull rod 23 is carried through a trunnion block 27 pivotally mounted between the side plates or limbs of the lever 24 at an intermediate point in the length of the lever, and a distance sleeve 28 is mounted on the rod between the trunnion block and a nut 29 which is adjustably screwed onto the end of the rod for adjusting the effective length of the rod.

The pin 25 on which the lever pivots is mounted in an eccentric bush 31 which is angularly movable in a bearing in the stationary housing 26. A control lever 32 of channel section is keyed to the bush 31 and in its normal position lies between the side plates of the actuating lever 24. A part of the control lever adjacent to its free end is formed with parallel lugs 33 which engage opposed flats on the nut 29 to lock the nut against rotation as shown more particularly in FIGURE 6. This part also carries a laterally projecting lug 34 for engagement with the actuating lever to form a stop for the angular movement of the control lever in a clockwise direction. To retain the control lever in its normal position opposed dimples 35 are formed in its side flanges for resilient engagement with recesses 36 pressed in the side plates of the actuating lever as shown in FIGURE 8.

To adjust the brake the control lever 32 is freed from the actuating lever and moved angularly in an anti-clockwise direction to move the eccentric bush 31 angularly, the lever then being in the position shown in dotted lines in FIGURE 9. The angular setting of the bush is such that this moves the axis of the pivot pin 25 through a predetermined distance away from the toggle links.

The adjusting nut 29 is then rotated until the clearances in the brake mechanism have been taken up, and the control lever 32 is returned to its original position, thus moving the pivot pin 25 back towards the toggle linkage and so providing a predetermined clearance in the transmission or between the friction surfaces of the brake.

The angular movement of the control lever may take the eccentric bush over dead centre so that the first part of the return movement of the lever tightens the coupling between the actuating lever and the toggle linkage, and if the nut has been over-tightened the control lever cannot be returned to its normal position and the operator is automatically warned that the adjusting nut should be slackened off. Correct adjustment can readily be gauged by the effort required to return the control lever.

There are slight differences in the shapes of the actuating levers 24 and the control levers 32 in the two embodiments shown in FIGURES 5 to 8 and FIGURES 9 and 10 respectively, but the construction and operation of the mechanism is exactly the same in each case.

I claim:

1. Brake actuating mechanism including a first part connected to a brake, a second part adapted to be connected to manually controlled brake operating means, and an operative connection between said first and second parts whereby movement of said second part is transmitted to said first part to operate said brakes, said operative connection including an eccentric member and a bearing member rotatably supporting said eccentric member, means connecting one of said members to the second part of said brake actuating mechanism, support means independent of said second part carrying the other of said members, and means connected to said eccentric member for rotating the same with respect to said bearing member to effect relative movement of said second part with respect to said first part by an amount determined by the eccentricity of said eccentric member.

2. Brake actuating mechanism incorporating an applying member of which the effective length is adjustable and comprising two aligned rods coupled by a pivotal connection comprising a fork end on one of the said rods, a transverse pin mounted in said fork end, an eccentric bush angularly movable on said pin, an eye in the other of said rods for receiving said bush, and means for moving said eccentric bush angularly to vary the relative axial positions of said rods.

3. Brake actuating mechanism incorporating an applying member of which the effective length is adjustable and comprising two aligned rods coupled by a pivotal connection comprising a fork end on one of said rods, a transverse pin mounted in said fork end, an eccentric bush angularly movable on said pin, an eye in the other of said rods for receiving said bush, and a lever keyed to said bush and angularly movable about said pin to move said bush angularly and vary the relative axial positions of said rods.

4. A disc brake comprising a stationary housing, a rotatable shaft within said housing, a pair of axially spaced discs slidably mounted on said shaft, annular braking surfaces on opposite sides of each disc, braking means for engagement with said annular braking surfaces, axially spaced radial surfaces in said housing, axially separable pressure plates located between the discs for bringing the discs into frictional engagement with the radial surfaces in the housing, co-operating inclined recesses in adjacent faces of said pressure plates, balls or rollers located in adjacent faces of said pressure plates, balls or rollers located in the recesses for urging apart the pressure plates on relative angular movement between the pressure plates, toggle links for effective relative angular movement between the plates, pivotal connections between the outer ends of the toggle links and the pressure plates, a pull-rod connected to the junction of said toggle links and of which the effective length is adjustable by an amount substantially equal to a desired clearance to be maintained between said braking surfaces and said braking means, said pull-rod comprising two aligned rods coupled by a pivotal connection comprising a fork end on one of said rods, a transverse pin mounted in said fork end, an eccentric bush angularly movable on said pin, an eye on the other of said rods for receiving said bush, and means for moving said bush angularly, whereby said eccentric bush is angularly movable to vary the relative axial position of said rods prior to the effective length of said pull-rod being adjusted to bring said braking means into contact with said braking surfaces, and which on return to its original position establishes said predetermined clearance between said braking surfaces and said braking means.

5. A disc brake comprising a stationary housing, a rotatable shaft within said housing, a pair of axially spaced discs slidably mounted on said shaft, annular braking surfaces on opposite sides of each disc, braking means for engagement with said annular braking surfaces, axially spaced radial surfaces in said housing, axially separable pressure plates located between the discs for bringing the discs into frictional engagement with the radial surfaces in the housing, co-operating inclined recesses in adjacent faces of said pressure plates, balls or rollers located in the recesses for urging apart the pressure plates on relative angular movement between the pressure plates, toggle links for effecting relative angular movement between the plates, pivotal connections between the outer ends of the toggle lines and the pressure plates, a pull-rod connected to the junction of said toggle links and of which the effective length is adjustable by an amount substantially equal to a desired clearance to be maintained between said braking surfaces and said braking means, said pull-rod comprising two aligned rods coupled by a pivotal connection comprising a fork end on one of said rods, a transverse pin mounted in said fork end, an eccentric bush angularly movable on said pin, an eye on the other of said rods for receiving said bush, and a lever keyed to said bush and angularly movable about said pin to move said bush angularly, whereby said eccentric bush is angularly movable to vary the relative axial position of said rods prior to the effective length of said pull-rod being adjusted to bring said braking means into contact with said braking surfaces, and which on return to its original position establishes said predetermined clearance between said braking surfaces and said braking means.

6. Brake actuating mechanism incorporating an applying rod, a nut adjustable on said rod, an actuating lever of which at least one end is bifurcated adapted to bear on said nut, and a pivotal connection between said one end of said lever and a stationary part comprising a transverse pin mounted in said bifurcated end of said lever, an eccentric bush angularly movable on said pin, a bearing in said stationary part for receiving said bush, and means for moving said eccentric bush angularly to vary the position of the axis of said pivotal connection.

7. Brake actuating mechanism incorporating an applying rod, a nut adjustable on said rod, an actuating lever of which at least one end is bifurcated adapted to bear on said nut, and a pivotal connection between said one end of said lever and a stationary part comprising a transverse pin mounted in said bifurcated end of said lever, an eccentric bush angularly movable on said pin, a bearing in said stationary part for receiving said bush, and a control lever keyed to said bush and angularly movable about said pin to move said bush angularly and vary the position of the axis of the said pivotal connection.

8. Brake actuating mechanism incorporating an applying rod, a nut adjustable on said rod and having opposed flats, an actuating lever of which at least one end is bifurcated adapted to bear on said nut, and a pivotal connection between said one end of said lever and a stationary part comprising a transverse pin mounted in said bifurcated end of said lever, an eccentric bush angularly movable on said pin, a bearing in said stationary part for receiving said bush, and a control lever keyed at one end of said eccentric bush and which in normal position lies substantially in alignment with said actuating lever, said control lever being angularly movable about said pin to move said bush angularly and vary the position of the axis of said pivotal connection, parallel lugs formed on the control lever adjacent to its free end adapted to engage said opposed flats on said nut to locate the nut against rotation when said control lever is in said normal position.

9. Brake actuating mechanism incorporating a pull-rod, a nut adjustable on said rod, an actuating lever of which at least one end is bifurcated adapted to bear on said nut, and a pivotal connection between said one end of said lever and a stationary part comprising a transverse pin mounted in said bifurcated end of said lever, an eccentric bush angularly movable on said pin, a bearing in said stationary part for receiving said bush, and a control lever keyed at one end to said eccentric bush and which in a normal position lies substantially in alignment with the actuating lever, said control lever being angularly movable about said pin to move said bush angularly and vary the position of the axis of said pivotal connection, and a laterally projecting lug formed on the control lever adjacent to its free end and adapted to engage said actuating lever to form a stop for angular movement of said control lever in one direction.

10. A disc brake comprising a stationary housing, a rotatable shaft within said housing, a pair of axially spaced discs slidably mounted on said shaft, annular braking surfaces on opposite sides of each disc, braking means for engagement with said annular braking surfaces, axially spaced radial surfaces in said housing, axially separable pressure plates located between the discs for bringing the discs into fractional engagement with the radial surfaces in the housing, co-operating inclined recesses in adjacent faces of said pressure plates, balls or rollers located in the recesses for urging apart the pressure plates on relative angular movement between the pressure plates, toggle links for effecting relative angular movement between the plates, pivotal connections between the outer ends of the toggle links and the pressure plates, a mechanical transmission of adjustable length pivotally connected to the junction of the toggle links and comprising at least two co-operating members of which the relative position is variable by an amount substantially equal to a desired clearance to be maintained between said braking surfaces and said braking means, and a pivotal connection between one of said members hereinafter called said first part and another part called said second part, said pivotal connection comprising a fork end on one of said first and second parts, a transverse pin mounted in said fork end, an eccentric bush angularly movable on said pin, an eye in the other of said first and second parts for receiving said bush, and means for moving said bush angularly to move the members of said transmission in one direction prior to the effective length of said transmission being adjusted to bring said braking means into contact with said braking surfaces, and which on return to its original position establishes said predetermined clearances between said braking surfaces and said braking means.

11. A disc brake comprising a stationary housing, a rotatable shaft within said housing, a pair of axially spaced discs slidably mounted on said shaft, annular braking surfaces on opposite sides of each disc, braking means for engagement with said annular braking surfaces, axially spaced radial surfaces in said housing, axially separable pressure plates located between the discs for bringing the discs into fractional engagement with the radial surfaces in the housing, co-operating inclined recesses in adjacent faces of said pressure plates, balls or rollers located in the recesses for urging apart the pressure plates on relative angular movement between the pressure plates, toggle links for effecting relative angular movement between the plates, pivotal connections between the outer ends of the toggle links and the pressure plates, a pull-rod connected to the junction of said toggle links, a nut adjustable on said rod, an actuating lever of which at least one end is bifurcated adapted to bear on said nut, a pivotal connection comprising a transverse pin mounted in said bifurcated end of said actuating lever, an eccentric bush angularly movable on said pin, a bearing in said stationary part for receiving said eccentric bush, and a control lever keyed to said bush and angularly movable about said pin to move said bush angularly and move the axis of said pivotal connection a predetermined distance away from said links whereby said nut is adjusted to bring said braking means into contact with said braking surfaces, and which on return to its original position establishes a desired clearance between said braking surfaces and said braking means.

References Cited by the Examiner

UNITED STATES PATENTS

| | | |
|---|---|---|
| 1,859,906 | 5/32 | Wilson. |
| 1,890,623 | 12/32 | Scott. |
| 2,001,239 | 5/35 | Buckendale _____ 188—79.5 |
| 2,077,844 | 4/37 | Leighton _____ 287—100 |
| 2,393,117 | 1/46 | McMullen et al. _____ 188—197 |
| 2,714,941 | 8/55 | Bauman. |

MILTON BUCHLER, *Primary Examiner.*

DUANE A. REGER, ARTHUR L. LA POINT,
*Examiners.*